United States Patent
Sanada et al.

(10) Patent No.: US 7,792,229 B2
(45) Date of Patent: Sep. 7, 2010

(54) PULSED BASED COMMUNICATION SYSTEM

(75) Inventors: Yukitoshi Sanada, Yokohama (JP); Jun Furukawa, Chiba (JP)

(73) Assignee: Semiconductor Technology Academic Research Center, Kanagawa (JP)

( * ) Notice: Subject to any disclaimer, the term of this patent is extended or adjusted under 35 U.S.C. 154(b) by 1011 days.

(21) Appl. No.: 10/951,807

(22) Filed: Sep. 29, 2004

(65) Prior Publication Data

US 2005/0100079 A1    May 12, 2005

(30) Foreign Application Priority Data

Nov. 10, 2003  (JP) ............................... 2003-379800

(51) Int. Cl.
*H04L 7/04* (2006.01)
*H04B 1/00* (2006.01)

(52) U.S. Cl. ................... 375/354; 375/362; 375/367; 375/368

(58) Field of Classification Search ........... 375/149, 375/145, 137, 134, 371, 354, 362, 368, 367, 375/366

See application file for complete search history.

(56) References Cited

U.S. PATENT DOCUMENTS

| | | | | |
|---|---|---|---|---|
| 4,870,682 | A * | 9/1989 | Morrey et al. ................... | 380/46 |
| 5,400,359 | A * | 3/1995 | Hikoso et al. ................ | 375/133 |
| 5,677,927 | A | 10/1997 | Fullerton et al. | |
| 6,041,074 | A * | 3/2000 | Nakamura .................... | 375/142 |
| 6,055,266 | A * | 4/2000 | Nakamura .................... | 375/140 |
| 6,625,229 | B2 * | 9/2003 | Dress et al. ................... | 375/295 |
| 6,661,833 | B1 * | 12/2003 | Black et al. ................... | 375/147 |
| 6,847,675 | B2 * | 1/2005 | Fullerton et al. ............. | 375/130 |
| 6,891,816 | B2 * | 5/2005 | Smith et al. .................. | 370/335 |
| 7,027,493 | B2 * | 4/2006 | Richards ...................... | 375/150 |
| 7,099,642 | B2 * | 8/2006 | Fernandez-Corbaton et al. ............................ | 455/255 |
| 7,130,332 | B1 * | 10/2006 | Shenoi ........................ | 375/150 |

(Continued)

FOREIGN PATENT DOCUMENTS

JP       4-113732         4/1992

(Continued)

OTHER PUBLICATIONS

Second Japanese Office Action mailed May 23, 2006 issued in priority Japanese Application No. 2003-379800.

(Continued)

*Primary Examiner*—David C Payne
*Assistant Examiner*—Linda Wong
(74) *Attorney, Agent, or Firm*—Staas & Halsey LLP

(57) ABSTRACT

A communication system for pulse based communication using a sequence acquisition system using the correlation method in UWB communications which generates a pulse detection signal differing in phase by exactly a predetermined period (τ) from the transmission information of a pulse signal of a predetermined period at the transmission side and reception side, uses the pulse detection signal to establish synchronization at the reception side, then generates transmission information at the reception side by making its phase different by exactly a predetermined time from the synchronized pulse detection signal so as to establish synchronization between the reception signal and the transmission information, whereby it is possible to enable synchronization acquisition and shorten the synchronization acquisition time without complicating the hardware and even without the presence of information in the transmission signal.

11 Claims, 7 Drawing Sheets

U.S. PATENT DOCUMENTS

| | | | |
|---|---|---|---|
| 7,206,334 B2* | 4/2007 | Siwiak | 375/146 |
| 7,254,208 B2* | 8/2007 | Tomerlin et al. | 375/373 |
| 2002/0031170 A1* | 3/2002 | Yoon | 375/140 |
| 2002/0036569 A1* | 3/2002 | Martin | 340/573.1 |
| 2003/0043931 A1* | 3/2003 | Fullerton et al. | 375/295 |
| 2003/0063683 A1* | 4/2003 | MacFarlane Shearer et al. | 375/295 |
| 2003/0108133 A1* | 6/2003 | Richards | 375/351 |
| 2003/0142656 A1* | 7/2003 | Padovani et al. | 370/347 |
| 2003/0189975 A1* | 10/2003 | Fullerton | 375/219 |
| 2003/0190889 A1* | 10/2003 | Nguyen et al. | 455/12.1 |
| 2003/0214932 A1* | 11/2003 | Ariyoshi et al. | 370/342 |
| 2004/0234017 A1* | 11/2004 | Tomerlin et al. | 375/354 |
| 2004/0258138 A1* | 12/2004 | Oishi et al. | 375/142 |

FOREIGN PATENT DOCUMENTS

| | | |
|---|---|---|
| JP | 6-69904 | 3/1994 |
| JP | 7-46222 | 2/1995 |
| JP | 10-508725 | 8/1998 |
| WO | WO 96/09694 | 3/1996 |

OTHER PUBLICATIONS

M.Z. Win and R. A. Scholtz, "Ultra-Wide Bandwidth Time-Hopping Spread-Spectrum Impulse Radio for Wireless Multiple-Access Communications", IEEE Trans. On Comm., vol. 48, No. 4, Apr. 2000, pp. 679-691.

K. Siwiak et al, "Ultra-Wide Band Radio: The Emergence of an Important New Technology", Vehicular Technology Conference, VTC 2001 Spring. IEEE VTS 53$^{rd}$, vol. 2, May 2001, pp. 1669-1172.

R. L. Peterson et al., "Introduction to Spread Spectrum Communications", Prentice-Hall, 1995, pp. 221-318.

Kazimierz Siwiak, "Ultra-Wide Band Radio: Introducing New Technology," Vehicular Technology Conference, VTC 2001 Spring., IEEE VTS 53$^{rd}$, vol. 2, May 6-9, 2001, pp. 1088-1093.

Fernando Rimirez-Mireles, "On the Performance of Ultra-Wide-Band Signal in Gausian Noise and Dense Multipath," IEEE Trans. on Vehicular Technology, vol. 50, No. 1, Jan. 2001, pp. 244-249.

Jack K. Holmes, "Acquisition Time Performance of PN Spread-Spectrum Systems," IEEE Trans. Comm., vol. Com-25, No. 8, Aug. 1997, pp. 778-784.

* cited by examiner

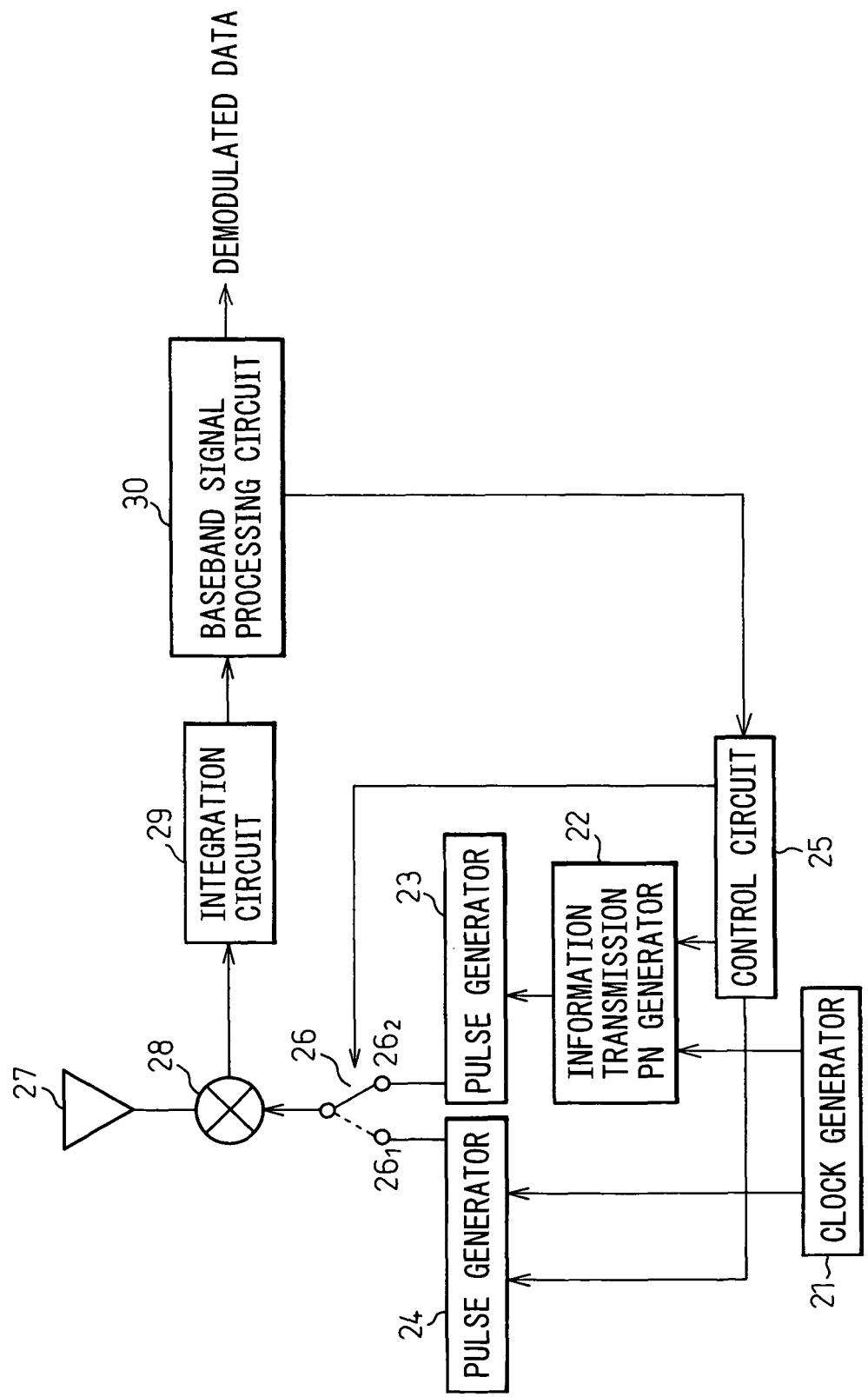

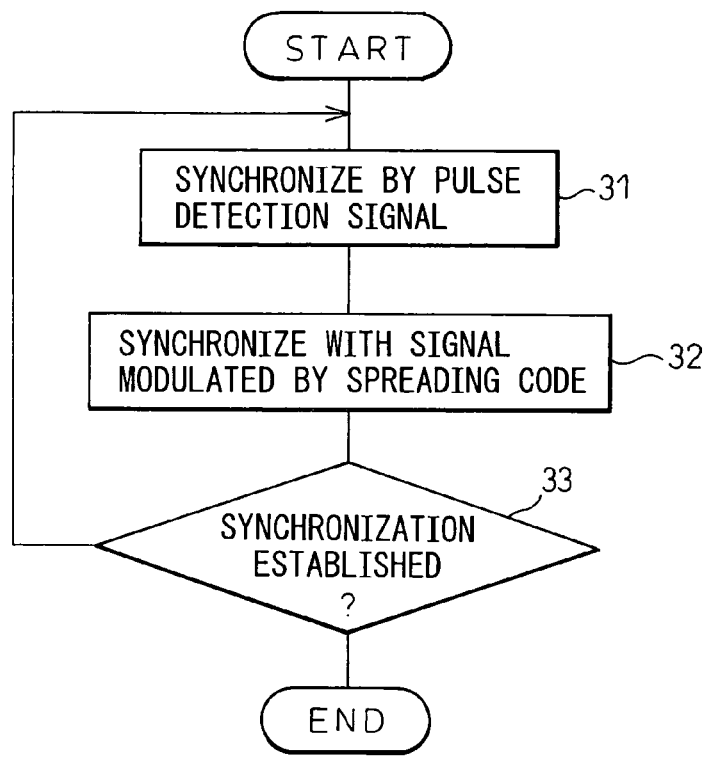
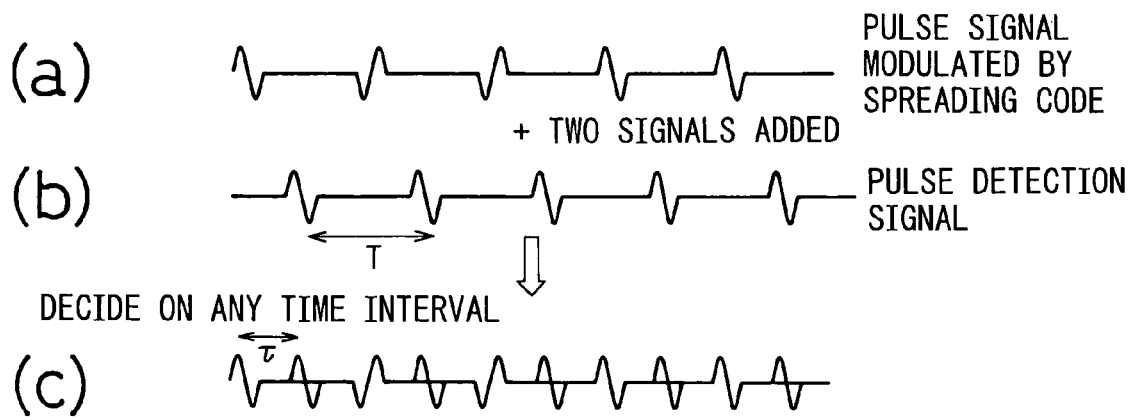

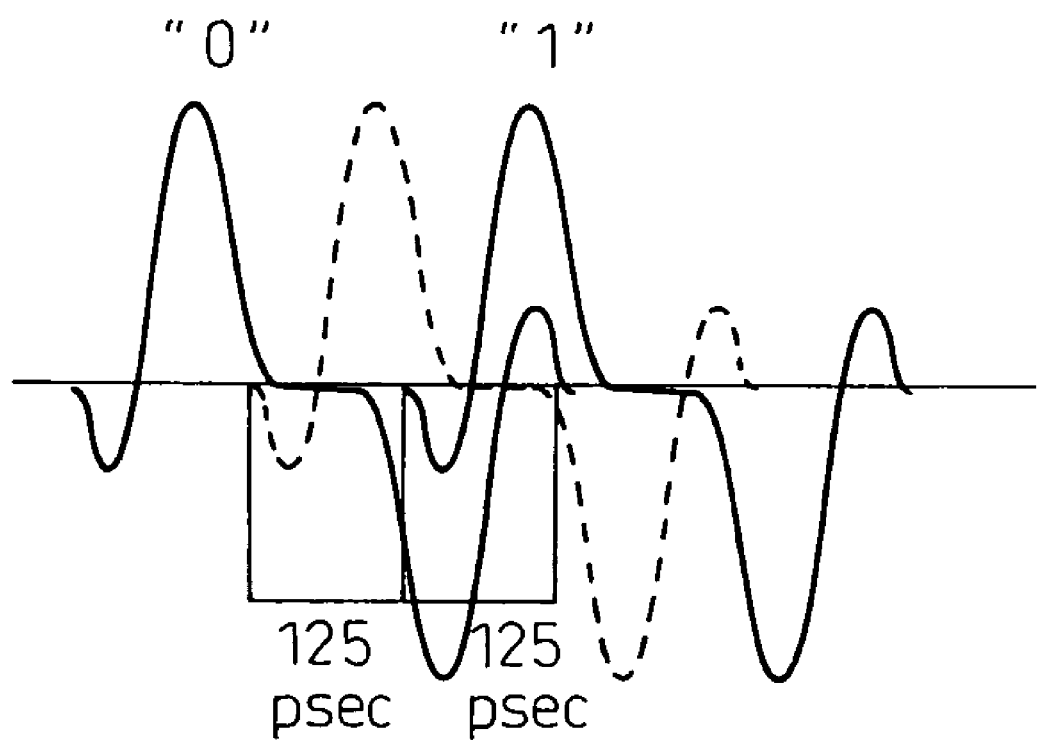

PULSED BASED COMMUNICATION SYSTEM

CROSS-REFERENCE TO RELATED APPLICATIONS

This application is based upon and claims a priority of Japanese Patent Application No. 2003-379800, filed on Nov. 10, 2003, the contents being incorporated herein by reference.

BACKGROUND OF THE INVENTION

1. Field of the Invention

The present invention relates to a pulse based communication system, more particularly relates to a synchronization acquisition method in an ultra wide band (UWB) or other pulse based communication system.

2. Description of the Related Art

A UWB system transfers signals in a pulse state without using carriers. The Federal Communications Commission (FCC) of the U.S. approved its use in the American private sector in 2002. The FCC defines UWB as "a wireless signal having a bandwidth of at least 500 MHz or an occupied bandwidth of at least 20% of the center frequency". UWB is the focus of much attention as technology enabling high speed communication. A UWB system has the merit of enabling sharing of the spectrum with other communication systems since it uses an extremely wide bandwidth and transmits with a low power. Further, the system transmits signals by pulses, so can eliminate the effects of multipath or fading (see M. Z. Win, R. A. Scholtz, "Ultra-Wide Bandwidth Time-Hopping Spread-Spectrum Impulse Radio for Wireless Multiple-Access Communications", IEEE Trans. on Commun., vol. 48, no. 4, April 2002, and K. Siwiak, P. Withington, S. Phelan, "Ultra-wide band radio: the emergence of an important new technology," Vehicular Technology Conference, VTC 2001 Spring IEEE VTS 53rd, vol. 2, pp. 1169-1172, May 2001).

The short pulse UWB waveform enables the effects of multipath to be avoided, so is applicable to indoor communication. The following description envisions a multipath-free addition type white noise AWGN model.

As described in Fernando Ramirez-Mireles, "On the Performance of Ultra-wide-Band Signal in Gaussian Noise and Dense Multipath," IEEE Trans. on Vehicular Technology, vol. 50, no. 1, January 2001, the waveform w(t) of a monocycle is given by the following equation (1):

$$w(t) = \left\{1 - 4\pi\left(\frac{t}{\tau_m}\right)^2\right\}\exp\left\{-2\pi\left(\frac{t}{\tau_m}\right)^2\right\} \quad (1)$$

where, $\tau_m$ is the magnitude of the pulse width

FIG. 11 is a view of an example of the waveform of a transmission signal modulated by a direct sequence (DS) scheme. In this example, S number (S is a positive integer) of successive pulses of a pulse string of a period $T_f$ express 1 bit of information. For the modulation system, TH (time hopping)-UWB is known in addition to the DS shown in FIG. 11 inverting the phases of the pulses.

FIG. 12 is a view explaining the DS-UWB modulation system. As shown in the figure, with DS-UWB, the pulses of the pulse string are inverted to define 0 and 1. This is similar to the binary phase shift keying (BPSK) technology in conventional CDMA defining information 1 and 0 by noninversion and inversion of phase of the carrier.

FIG. 13 is a view for explaining the TH-UWB modulation system. As shown in this figure, with TH-UWB, positions of the pulses on the axis are shifted for example 125 picoseconds and 0 and 1 are defined by those positions.

In each modulation system, as explained above, S number (S is a positive integer) of successive pulses (PN code or Baker code) are spread in spectrum to express 1 bit of information.

In a DS modulation or TH modulation UWB system, the synchronization of the code is an important issue. In many cases, synchronization acquisition is necessary in the state with a very low SN ratio or in the presence of interference waves.

In spread spectrum communication in the DS modulation or TH modulation UWB system, synchronization acquisition methods of the related art include the synchronization acquisition method using a matched filter and the synchronization acquisition method using the correlation method.

The synchronization acquisition method using a matched filter enables fast synchronization acquisition, but the hardware becomes large in size.

The synchronization acquisition method using the correlation method is relatively simple in terms of hardware, but ends up taking time for synchronization acquisition.

To shorten the time for synchronization acquisition, there is the method of synchronization acquisition using a plurality of correlators. However, this method results in a complicated receiver and increases the power consumption.

As a general method of initial synchronization by the correlation method, there is the method of successively changing the possible state of phases until the correct code phase is obtained. Each phase is evaluated as to whether it is correct by trying out the despread in the received signal. If the estimated code phase is correct, despread is performed and the correlation peak is detected. Further, if the estimated code phase is not correct, despread is not performed and the reference signal is changed to the next phase for the next estimation. This technique is called a "serial search" (see Roger L. Peterson, Roger L. Ziemer, David E. Borth, Introduction to Spread Spectrum Communications, Prentice-Hall 1995).

However, according to this serial search method in the correlation method, there is the problem that the longer the absence of information in the transmission signal continues, the longer the time required for synchronization acquisition at the reception side (for other publications on the related art, see Kazimierz. SIWIAK, "Ultra-wide Band Radio: Introducing a New Technology," Vehicular Technology Conference, VTC 2001 Spring, IEEE VTS 53rd, vol. 2, 6-9 May 2001 and Jack K. Holmes, "Acquisition Time Performance of PN Spread-Spectrum Systems," IEEE Trans. Commun., COM-25, 8, pp. 778-783, August 1977).

SUMMARY OF THE INVENTION

An object of the present invention is to provide a synchronization acquisition system using the correlation method in pulse based communications such as UWB communications which enables synchronization acquisition and shortens the synchronization acquisition time without complicating the hardware and even without the presence of information in the communication signal.

To achieve the above object, according to a first aspect of the present invention, there is provided a transmission circuit for pulse based communication, provided with a first pulse generator for generating transmission information as a pulse signal of a predetermined period, a second pulse generator for generating a pulse detection signal at the predetermined period, a control circuit for controlling the first pulse generator and the second pulse generator to make a phase difference of the phases of the pulses output from the first pulse generator and the second pulse generator a predetermined value, and an adder for adding the output of the first pulse generator and the output of the second pulse generator and outputting the result.

According to a second aspect of the present invention, there is provided a reception circuit for pulse based communication, provided with a reception side first pulse generator for generating transmission information as a pulse signal of a predetermined period, a reception side second pulse generator for generating a pulse detection signal at the predetermined period, a control circuit for making a phase difference of the phases of the pulses output from the first pulse generator and the second pulse generator a predetermined value, a multiplier for multiplying a received signal with one of the output of the first pulse generator and the output of the second pulse generator, and a demodulating means for reproducing demodulated data from output of the multiplier, at a first stage of synchronization acquisition, having the multiplier give the result of multiplication of the pulse detection signal output from the second pulse generator with the received signal to the demodulating means and establish synchronization of the pulse detection signal by the demodulating means and, after the first stage, controlling the first pulse generator by the control circuit so that an output of the first pulse generator differs from the phase of the pulses output from the second pulse generator by exactly the predetermined value so as to establish synchronization between the received signal and the output signal of the first pulse generator.

According to a third aspect of the invention, there is provided a communication system provided with the above transmission circuit and reception circuit.

According to a fourth aspect of the invention, there is provided a synchronization acquisition method for pulse based communication, comprising generating a pulse detection signal with a phase different by exactly a predetermined period from transmission information of a pulse signal of a predetermined period, establishing synchronization at a reception side using the pulse detection signal, then generating at the reception side the transmission information by making the phase different by exactly the predetermined time from the pulse detection signal for which synchronization is established so as to establish synchronization between a received signal and the transmission information.

By first establishing synchronization by a pulse detection signal, then synchronizing the pulse signal including the transmission information in the synchronization acquisition system using the correlation method in UWB communication or other pulse based communication, synchronization acquisition becomes possible and the synchronization acquisition time can be shortened without complicating the hardware and even without the presence of transmission information in the transmission signal.

BRIEF DESCRIPTION OF THE DRAWINGS

These and other objects and features of the present invention will become clearer from the following description of the preferred embodiments given with reference to the attached drawings, wherein:

FIG. 2 is a block diagram of the configuration of a UWB reception circuit according to an embodiment of the present invention;

FIG. 3 is a flow chart for explaining the operation of a UWB communication system according to the embodiment of the present invention shown in FIG. 1 and FIG. 2;

FIG. 4 is a view of an output signal from the transmission circuit shown in FIG. 1;

FIG. 13 is a view for explaining a TH-UWB modulation system.

DESCRIPTION OF THE PREFERRED EMBODIMENTS

Preferred embodiments of the present invention will be described in detail below while referring to the attached figures.

The object of shortening the synchronization acquisition time by the correlation method in pulse based communications is realized by establishing synchronization by a pulse detection signal even without the presence of transmission information in the transmission signal.

Example 1

Figure 1:
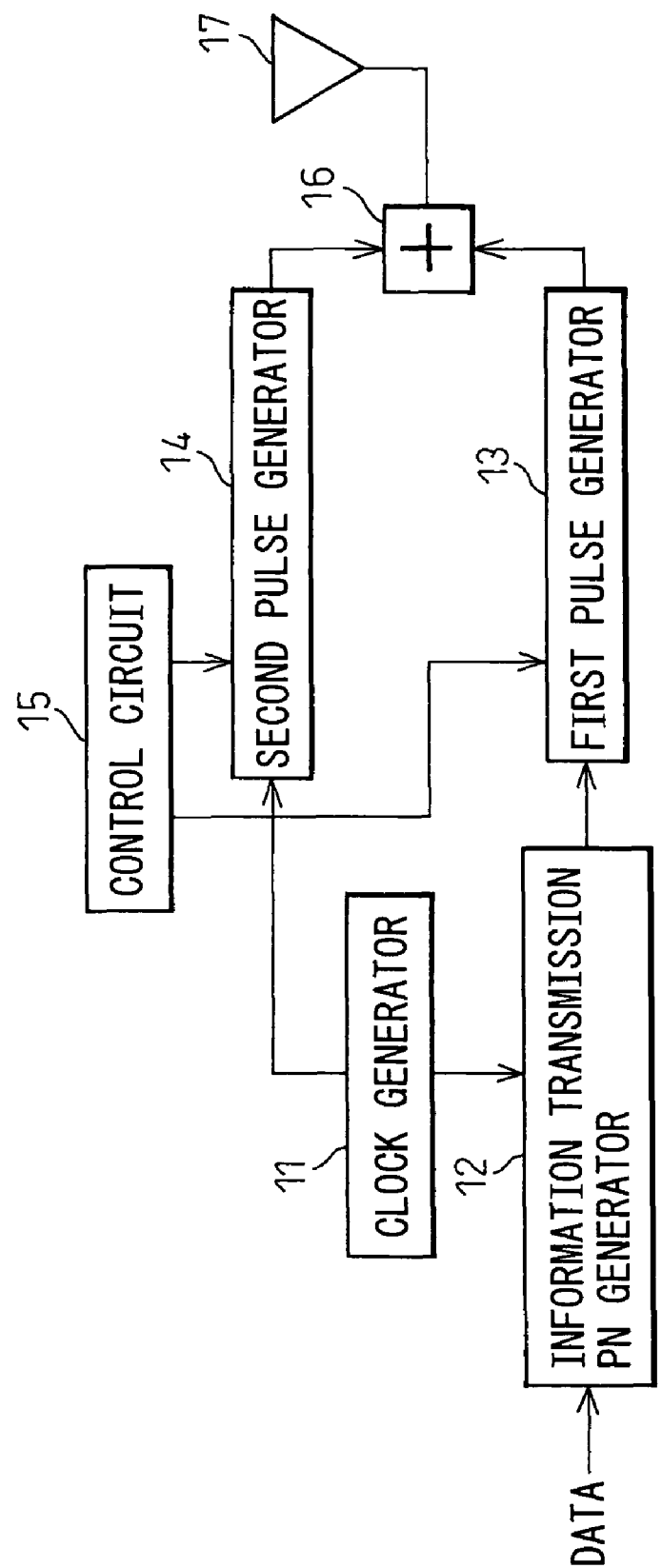
FIG. 1 is a block diagram of the configuration of a UWB transmission circuit according to an embodiment of the present invention.
Figure 11:
FIG. 11 is a view of an example of the waveform of a transmission signal modulated by a discrete sequence (DS)
Figure 12:
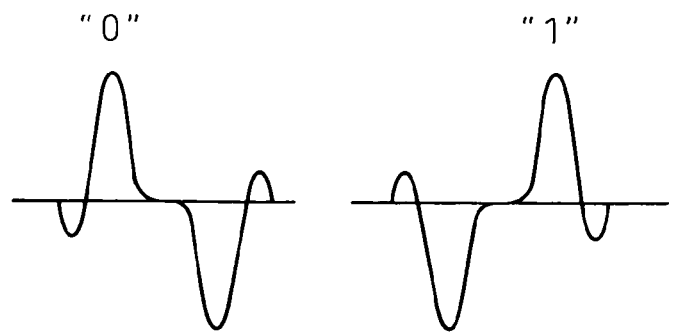
FIG. 12 is a view for explaining a DS-UWB modulation system.

FIG. 1 is a block diagram of the configuration of a UWB transmission circuit according to an embodiment of the present invention. In the figure, reference numeral 11 is a clock generator for generating a pulse every for example 100 ns, 12 is an information transmission pseudo noise (PN) generator for generating an information transmission PN signal based on the transmission data and output of the clock generator 1, 13 is a first pulse generator for generating the pulse of a UWB signal modulated by a spreading code (PN code or Baker code) based on the output of the information transmission PN generator 12, 14 is a second pulse generator for generating a pulse detection signal by a predetermined period of for example 100 ns based on the output of the clock generator 11, 15 is a control circuit for controlling the first and second pulse generators 13 and 14, 16 is an adder for adding the outputs of the first and second pulse generators 13 and 14, and 17 is an antenna for transmitting an output of the adder 16. Further, in the present embodiment, the transmission circuit shown in FIG. 11 performs packet communication. The control circuit 15 controls the first and second pulse generators 13 and 14 so that the phase of the pulse output from the second pulse generator 14 at the head of a packet is output delayed by exactly a predetermined fixed time τ from the phase of the pulse signal modulated by the PN codes output from the first pulse generator.

By providing the second pulse generator 14 never present in the past, regardless of whether the information transmission PN generator is generating information or not, a pulse of a certain period is transmitted from the second pulse generator 14 at the head part of the packet, so at the reception side, by receiving this pulse from the second pulse generator 14, it is possible to achieve synchronization acquisition quicker even without the presence of the information transmission spreading code.

FIG. 2 is a block diagram of the configuration of a UWB reception circuit according to an embodiment of the present invention. In the figure, reference numeral 21 is a clock generator for generating a clock signal of the same period as the clock signal generated by the clock generator in the transmission circuit, 22 is an information transmission PN generator for generating a spreading code for reproducing a baseband signal from the signal received, 23 is a reception side first pulse generator for generating a pulse of a UWB signal based on the output of the information transmission PN generator 22, 24 is a reception signal second pulse generator for generating a pulse signal of the same period as the pulse signal generated by the second pulse generator 14 in the transmission circuit, 25 a control circuit for controlling the second pulse generator 25 and information transmission PN generator 22, 26 a switch, 27 a reception antenna, 28 a multiplier for multiplying the output of the first pulse generator 23 or second pulse generator 24 with the signal received from the reception antenna 27, 29 is an integration circuit for integrating the output of the multiplier 28 for a predetermined number of successive PN codes to reproduce information, and 30 is a baseband signal processing circuit for outputting the baseband signal as demodulated data from the integration circuit 29. The integration circuit 29 and baseband signal processing circuit 30 form the demodulating means. The control circuit 25 controls the first and second pulse generators 23 and 25 so that the phase of the pulse output from the second pulse generator 24 is delayed by exactly a predetermined fixed time τ from the phase of the pulse signal modulated by the PN code output from the first pulse generator 23.

Figure 5:
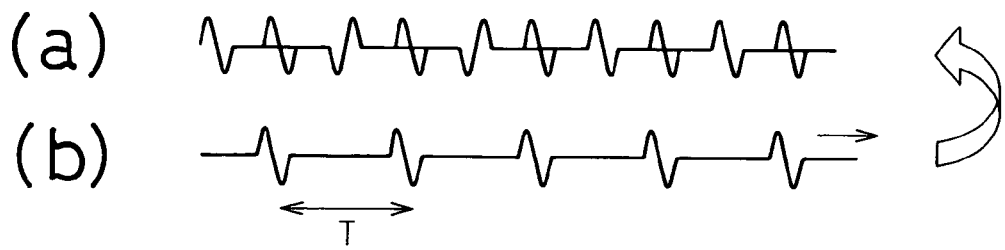
FIG. 5 is a view for explaining a first stage of phase synchronization according to an embodiment of the present invention.
Figure 6:
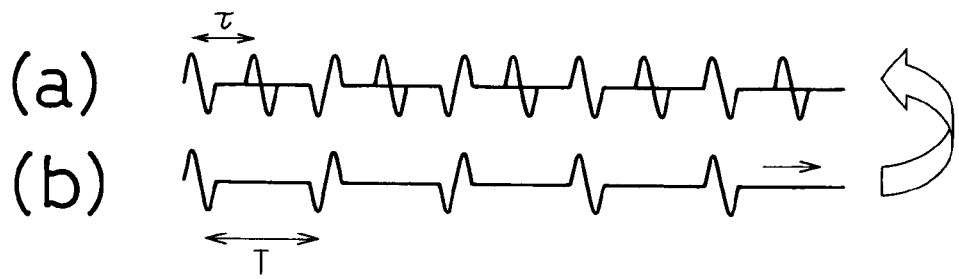
FIG. 6 is a view for explaining a second stage of phase synchronization according to an embodiment of the present invention.

FIG. 3 is a flow chart for explaining the operation of the UWB communication system according to an embodiment of the present invention shown in FIG. 1 and FIG. 2, FIG. 4 is a view of an output signal from the transmission circuit shown in FIG. 1, FIG. 5 is a view for explaining a first stage of phase synchronization according to an embodiment of the present invention, and FIG. 6 is a view for explaining a second stage of phase synchronization according to an embodiment of the present invention. The synchronization acquisition method according to the embodiment of the present invention will be explained with reference to FIG. 3 to FIG. 6.

First, the transmission circuit outputs a signal comprised of the output of the first pulse generator 13 and the output of the second pulse generator 14 superposed through the antenna 17.

In FIG. 4, (a) shows a pulse signal modulated by a PN code (spreading code) as the output of the first pulse generator 123, (b) shows the output signal of the second pulse generator 14, and (c) shows the output signal of the adder 16 adding the two. As shown by (a) of the figure, a spreading code is a pulse string of a predetermined period T. Each pulse string shows bit information by a combination of pulses with noninverted phases and phases with inverted phases. When there is no transmission information, there are also no pulses in the spreading code. Further, as shown in (b), the output signal of the second pulse generator 14 is a pulse detection signal comprised of a pulse string of a fixed period. Further, as shown in (c), the time duration τ between the output phase of the first pulse generator 13 and the output phase of the second pulse generator 14 is set in advance freely.

At the initial stage of synchronization acquisition in the reception circuit, the switch 26 in the reception circuit is connected to the contact 26₁ as shown by the broken line in FIG. 2. Therefore, the multiplier 28 multiplies the output of the reception side second pulse generator 24 and the reception signal. As a result, as shown at step 31 of FIG. 3, the reception circuit first performs synchronization acquisition by the pulse detection signal. The pulse detection signal, as shown by (b) of FIG. 4, is a pulse string of a fixed period with no relation to the presence of PN code, so synchronization acquisition is possible in the period T. At this stage, there is no need to consider the phase of the spreading code.

(a) of FIG. 5 shows the reception signal, while (b) shows the output of the reception side second pulse generator 24. To synchronize with the output of the second pulse generator 14 in the transmission circuit included in the reception signal (a) the output of the second pulse generator 24 in the reception circuit, the phase of the output (b) of the second pulse generator 24 is shifted by the control circuit 25. The output of the integration circuit 29 peaks in one period T of the pulse detection signal at the time of synchronization acquisition.

After synchronization acquisition succeeds, as shown by step 32 in FIG. 3, the reception signal is synchronized with the signal modulated by the spreading code. This is performed by connecting the switch 26 of the reception circuit with the contact 26₂ by switching to the solid line direction in the figure. That is, the control circuit 25 connects the switch 26 to the contact 26₂ side when the output of the baseband signal processing circuit 30 indicates completion of synchronization acquisition. Further, the pulse string output from the reception side first pulse generator 23 modulated by the PN code output from the information transmission PN generator 22 is synchronized with the reception signal.

(a) of FIG. 6 shows the reception side, while (b) shows the output of the reception side first pulse generator 23. As shown in the figure, the pulse detection signal output from the second pulse generator 24 is delayed by exactly the predetermined time τ from the pulse output from the first pulse generator 23, so by causing a signal advanced exactly by τ from the phase of the output of the second pulse generator 24 for which synchronization acquisition has already been finished to be output from the first pulse generator 23 under the control of the control circuit 25, the spreading code is also immediately synchronized in the period T of the pulse detection signal.

Next, at step 33, whether synchronization has been established is constantly judged. When synchronization is lost, steps 31 and 32 are repeated. Due to this, even if failing in synchronization acquisition, by just sliding the reception side pulse detection signal at intervals of the period T of the pulse detection signal, synchronization acquisition can be immediately restored. It is possible to eliminate wasteful integration time at a part with no pulses and realize high speed synchronization acquisition.

Figure 7:
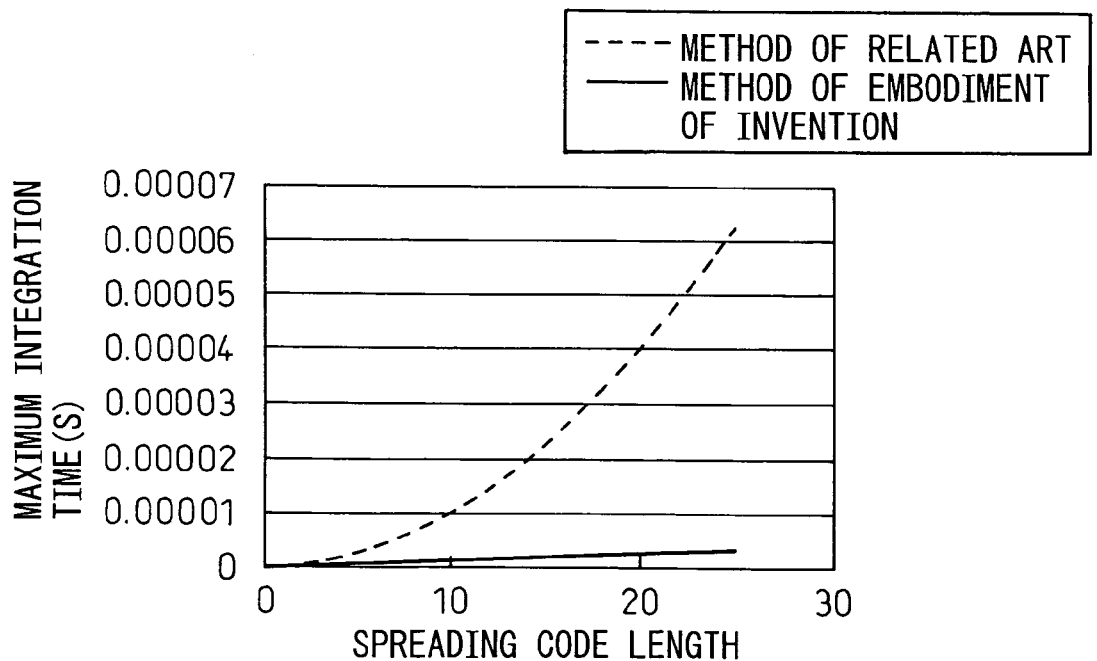
FIG. 7 is a graph comparing a synchronization acquisition time according to an embodiment of the present invention with the related art.

FIG. 7 is a graph comparing the synchronization acquisition time according to the embodiment of the present invention with the related art. As shown, the maximum integration time was 0.00004 second in the related art when the spreading code length was 20, while according to the embodiment of the present invention, it was 0.00001 second or ¼ of that. It is learned that according to the embodiment of the present invention, the synchronization acquisition time is greatly shortened. That is, the maximum integration time in the past was the pulse interval×spreading code length×dwell time× sliding interval, while according to the embodiment of the present invention, the maximum integration time is the pulse interval×sliding interval+spreading code length×dwell time. The maximum integral time becomes shorter in the embodiment of the present invention the longer the spreading code length.

The embodiment of the present invention will be explained in further detail next.

The average synchronization acquisition time is given as follows in the synchronization acquisition method using a correlator of the related art:

$$\bar{T}_s = (C-1)(T_i + T_{fa}P_{fa})\left(\frac{2-P_d}{2P_d}\right) \quad (2)$$

where, $P_{fa}$ is the false alarm probability, $P_d$ is the detection probability, $T_i$ the dwell time, $T_{fa}$ the penalty time, and C the number of search cells.

According to this embodiment of the present invention, by reducing the number C of the search cells in equation (2), it is possible to shorten the mean synchronization acquisition time. To compare the system according to the embodiment of the present invention and the system of the related art, assume here the ideal channel with no noise. The average synchronization acquisition time of the ideal channel (that is, $P_d=1$, $P_{fa}=0$) is given as follows:

$$\bar{T}_s = \frac{C+1}{2}T_i \quad (3)$$

The number C of search cells of the method of the related art is given as follows:

$$C_C = \frac{T_f S}{\Delta t} \quad (4)$$

The number C of search cells according to the embodiment of the present invention is given as follows:

$$C_P = \frac{T_f}{\Delta t + S} \quad (5)$$

where, $T_f$ is the frame time, $\Delta t$ is the size of the search cell, and S is the length of the spreading code. The relationship of these values is given as follows:

$$\Delta t < T_f \ll 1 < S \quad (6)$$

As will be clear from equations (4), (5), and (6), $C_C > C_P$. The system according to this embodiment of the present invention can acquire synchronization S-times faster than the system of the related art.

Next, the "mean acquisition time versus the sequence length of the code", the "acquisition success probability versus $E_b/N_o$", and the "acquisition success probability versus acquisition limit time" of the following simulation model will be explained based on the graphs shown in FIG. 8 to FIG. 10.

The simulation model is shown in the following table.

TABLE 1

| Radio system | DS-UWB |
|---|---|
| Channel | AWGN channel |
| Modulation format | BPSK |
| Sequence | M-sequence |
| Frame time Tf | 1 ns |
| Pulse duration | 200 ps |
| Searching stepsize | 20 ps |
| Dwell time | STf |

Figure 8:
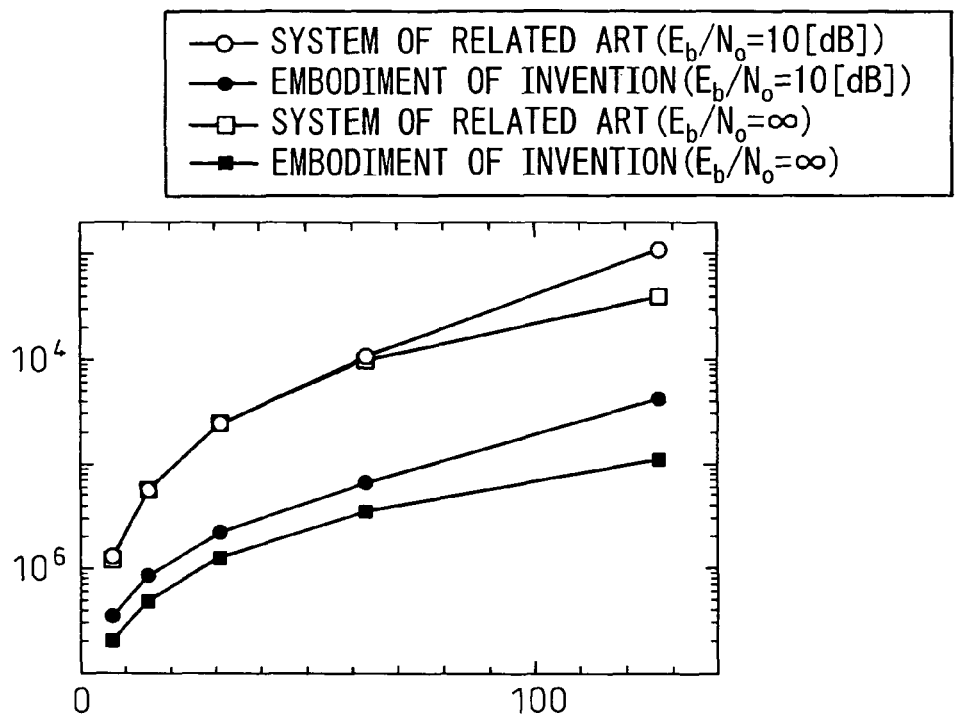
FIG. 8 is a graph of the mean acquisition time versus sequence length of the code according to an embodiment of the present invention.

FIG. 8 is a graph showing the mean acquisition time vs. sequence length of the codes. The dwell time is assumed to be the length of 1 bit, that is, STf.

As will be understood from the figure, the synchronization acquisition speed is about S-times faster in the system according to this embodiment of the present invention compared with the system of the related art. That is, in the system according to this embodiment of the present invention, the longer the length of the sequence of the code expressing 1 bit, the greater the effect.

Figure 9:
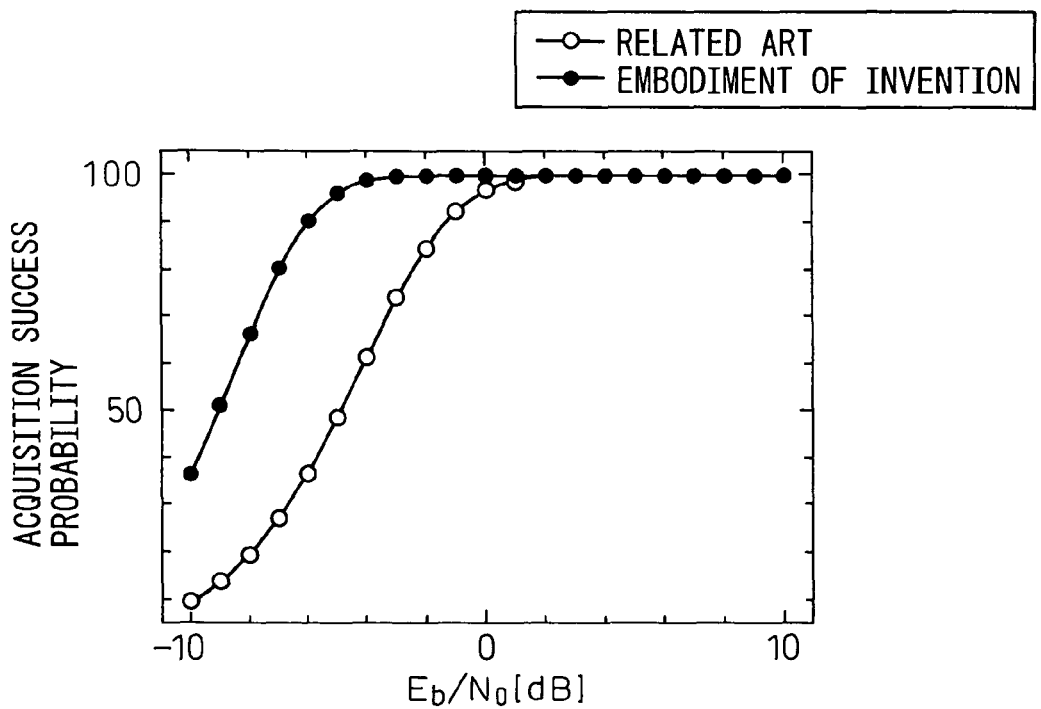
FIG. 9 is a graph of an acquisition success probability versus $E_b/N_o$ according to an embodiment of the present invention.

FIG. 9 is a graph of the acquisition success probability versus $E_b/N_o$. The "success probability of synchronization acquisition" is the probability that synchronization acquisition can be achieved within the limit time $T_1$. The number of tries was made 100,000, the synchronization acquisition limit time $T_1$ was made 4.9 μs, the length of the sequence of the code expressing 1 bit was made 7, and the dwell time $ST_f$ was made 7.0 ns.

As will be clear from the figure, the acquisition success probability is higher in the system according to this embodiment of the present invention than the system of the related art when $E_b/N_o$ is smaller than 0 dB. In environments where $E_b/N_o$ is better than −4 dB, the system according to this embodiment of the present invention exhibits a success probability close to 100%.

Figure 10:
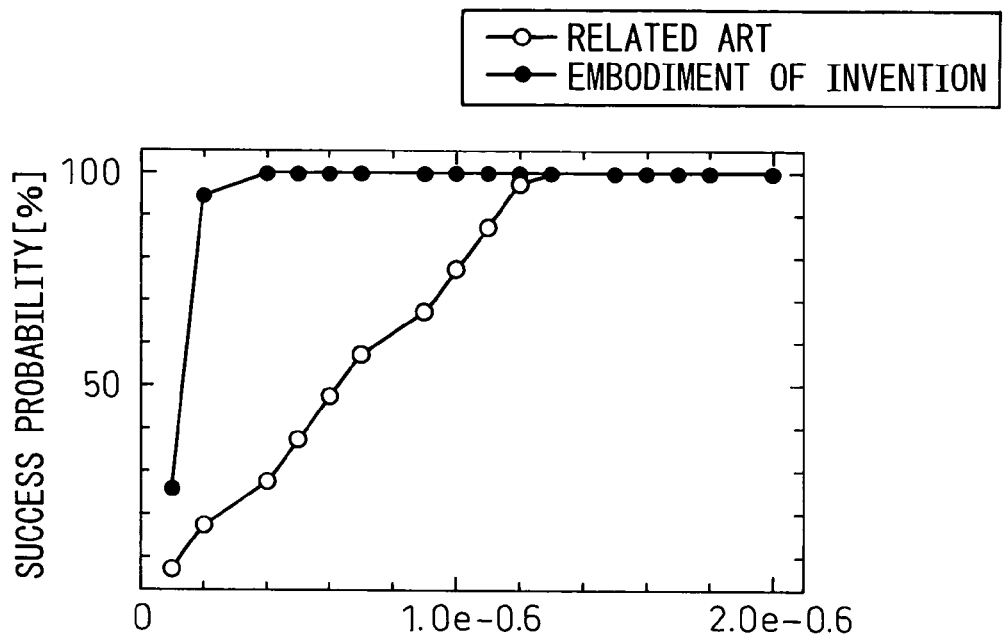
FIG. 10 is a graph of an acquisition success probability versus acquisition limit time according to an embodiment of the present invention.

FIG. 10 is a graph of the acquisition success probability versus acquisition limit time. The $E_b/N_o$ in this case is 10 dB. As will be clear from the figure, when the limit time of synchronization acquisition is smaller than $1.2 \times 10^{-6}$, the success probability is better with the system according to this embodiment of the present invention than the system of the related art. In the system according to this embodiment of the present invention, a faster, higher success is achieved as the limit time of synchronization acquisition increases. As opposed to this, in the system of the related art, the improvement in the success probability along with an increase in the limit time is far slower. In this way, with the system according to the embodiment of the present invention, the average synchronization acquisition time is far shorter than the system of the related art, so in a certain period, the system according to the embodiment of the present invention has much greater chances of synchronization acquisition than the system of the related art. Therefore, it is learned that the synchronization acquisition success probability of the system according to the embodiment of the present invention is better than the system of the related art in the same period.

The present invention is not limited to the embodiment described above. For example, DS-UWB was used as the radio system, but it is also possible to use TH-UWB or TM (time modulation)-UWB instead. Further, the invention can also be applied to UWB other than the UWB defined by the FCC. Further, BPSK was used as the modulation format, but it is also possible to use BPAK instead. Further, the present invention is not limited to packet communication. It can also be applied to all baseband communication for transfer of signals for synchronization.

As explained above, according to the present invention, a novel synchronization acquisition method in impulse based UWB has been proposed. The system of the present invention can reduce the average synchronization acquisition time by S orders (S being a spreading code length expressing 1 bit) compared with the system of the related art. Further, in the same limit time, the synchronization acquisition success probability of the system according to the present invention is higher than that of the system of the related art. Further, according to the system of the present invention, it is possible to achieve fast synchronization acquisition and high success synchronization acquisition without complicating the hardware.

While the invention has been described with reference to specific embodiments chosen for purpose of illustration, it should be apparent that numerous modifications could be made thereto by those skilled in the art without departing from the basic concept and scope of the invention.

What is claimed is:

1. A transmission circuit for pulse based communication, provided with:
    a first pulse generator for generating transmission information as a pulse signal of a predetermined period, said transmission information being generated by an information transmission PN code or an information transmission Baker Code,
    a second pulse generator generating a pulse detection signal at said predetermined period, said pulse detection signal being a clock signal without having said information transmission PN code or said information transmission Baker code,
    a control circuit controlling said first pulse generator and said second pulse generator to make a phase difference of the phases of the pulses output from said first pulse generator and said second pulse generator so that the pulses output form the second pulse generator are delayed from the pulses output from the first pulse generator by a predetermined time, and
    an adder adding the output of said first pulse generator and the output of said second pulse generator and outputting the result; wherein
    a synchronization acquisition time is shortened even without the presence of transmission information in a communication signal.

2. A transmission circuit as set forth in claim 1, wherein said pulse based communication is impulse based UWB.

3. A reception circuit for pulse based communication, provided with:
    a reception side first pulse generator generating transmission information as a pulse signal of a predetermined period, said transmission information being generated by an information transmission PN code or an information transmission Baker Code,
    a reception side second pulse generator generating a pulse detection signal at said predetermined period, said pulse detection signal being a clock signal without having said information transmission PN Code or said information transmission Baker Code,
    a control circuit making a phase difference of the phases of the pulses output from said first pulse generator and said second pulse generator so that the pulses output from the second pulse generator are delayed from the pulses output from the first pulse generator by a predetermined time,
    a multiplier multiplying a received signal with one of the output of said first pulse generator and the output of said second pulse generator, and
    a demodulating means reproducing demodulated data from output of said multiplier,
    at a first stage of synchronization acquisition, having said multiplier give the result of multiplication of said pulse detection signal output from said second pulse generator with the received signal to said demodulating means and establish synchronization of said pulse detection signal by said demodulating means and,
    after said first stage, controlling said first pulse generator by said control circuit so that an output of said first pulse generator differs from the phase of the pulse output from said second pulse generator by exactly said predetermined value so as to establish synchronization between the received signal and the output signal of said first pulse generator; wherein
    a time for synchronization acquisition is shortened even without the presence of transmission information in a communication signal.

4. A reception circuit as set forth in claim 3, wherein said pulse based communication is impulse based UWB.

5. A communication system for pulse based communication, provided with:
    a transmission circuit provided with:
    a first pulse generator generating transmission information as a pulse signal of a predetermined period, said transmission information being generated by an information transmission information in a communication signal.

6. A communication system as set forth in claim 5, wherein said pulse based communication is impulse based UWB.

7. A synchronization acquisition method for pulse based communication, comprising:
    generating a pulse detection signal with a phase different by exactly a predetermined period from transmission information of a pulse signal of a predetermined period, said transmission information being generated by an information transmission PN code or an information transmission Baker Code, and said pulse detection signal being a clock signal without having said information transmission PN code or said information transmission Baker code,
    establishing synchronization at a reception side using said pulse detection signal, then
    generating at the reception side said transmission information by making the phase different by exactly said predetermined time from said pulse detection signal for which synchronization is established so as to establish synchronization between a received signal and said transmission information; wherein
    a time for the establishing synchronization is shortened even without the presence of transmission information in a communication signal.

8. A synchronization acquisition method as set forth in claim 7, wherein said pulse based communication is impulse based UWB.

9. A synchronization acquisition method as set forth in claim 7, wherein said transmission information is comprised of a direct sequence (DS) modulated code comprised of a sequence of inverted and noninverted pulses.

10. A synchronization acquisition method as set forth in claim 7, wherein said transmission information is a code time hopping (TH) modulated according to whether the phase of each pulse is shifted by a predetermined time.

11. A method of pulse based communication, comprising:
    generating a pulse signal having a predetermined period, the pulse signal being generated by an information transmission PN code or an information transmission Baker Code;

generating a pulse detection signal at the predetermined period, the pulse detection signal being a clock signal without having said information transmission PN code or said information transmission Baker code;

comparing a phase of the pulse signal to a phase of the pulse detection signal;

making a phase difference between the phase of the pulse signal and the phase of the pulse detection signal so that the pulse detection signal is delayed from the pulse signal by a predetermined time;

adding the pulse signal and the pulse detection signal to form a resulting signal; and outputting the resulting signal.

* * * * *

UNITED STATES PATENT AND TRADEMARK OFFICE
CERTIFICATE OF CORRECTION

| | | |
|---|---|---|
| PATENT NO. | : 7,792,229 B2 | |
| APPLICATION NO. | : 10/951807 | |
| DATED | : September 7, 2010 | |
| INVENTOR(S) | : Yukitoshi Sanada et al. | |

It is certified that error appears in the above-identified patent and that said Letters Patent is hereby corrected as shown below:

Title page Column 1 (Title), item [54] Line 1, Delete "PULSED" and insert -- PULSE --, therefor.
Column 1, Line 1, Delete "PULSED" and insert -- PULSE --, therefor.
Column 9, Line 22, In Claim 1, after "generator" delete "for".
Column 9, Line 36, In Claim 1, Delete "form" and insert -- from --, therefor.
Column 9, Line 57, In Claim 3, Delete "PN Code" and insert -- PN code --, therefor.
Column 10, Line 16, In Claim 3, after "for" insert -- the --.
Column 10, Line 21-27, In Claim 5, Delete "A communication system for pulse based communication, provided with:
a transmission circuit provided with:
a first pulse generator generating transmission information as a pulse signal of a predetermined period, said transmission information being generated by an information transmission information in a communication signal." and
insert -- A communication system for pulse based communication, provided with:
    a transmission circuit provided with:
    a first pulse generator generating transmission information as a pulse signal of a predetermined period, said transmission information being generated by an information transmission PN code or an information transmission Baker Code,
    a second pulse generator generating a pulse detection signal at said predetermined period, said pulse detection signal being a clock signal without having said information transmission PN code or said information transmission Baker Code,
    a control circuit controlling said first pulse generator and said second pulse generator to make a phase difference of the phases of the pulses output from first pulse generator and said second pulse generator so that the pulses output from the second pulse generator are delayed from the pulses output from the first pulse generator by a predetermined time, and
    an adder adding the output of said first pulse generator and the output of said second pulse generator and outputting the result;
    a reception side first pulse generator generating transmission information as a pulse signal of a predetermined period, said transmission information being generated by an information transmission PN code or an information transmission Baker Code, Signed and Sealed this
Seventh Day of February, 2012

David J. Kappos
*Director of the United States Patent and Trademark Office* a reception side second pulse generator generating a pulse detection signal at said predetermined period, said pulse detection signal being a clock signal without having said information transmission PN code or said information transmission Baker code, a control circuit making a phase difference of the phases of the pulses output from said reception side first pulse generator and said reception side second pulse generator so that the pulses output from the reception side second pulse generator are delayed from the pulses output from the reception side first pulse generator by the predetermined time, a multiplier multiplying a received signal with one of the output of said reception side first pulse generator and the output of said reception side second pulse generator, and a demodulating means reproducing demodulated data from the output of said multiplier, at a first stage of synchronization acquisition, having said multiplier give the result of multiplication of said pulse detection signal output from said reception side second pulse generator with the received signal to said demodulating means and establish synchronization of said pulse detection signal by said demodulating means and, after said first stage, controlling said reception side first pulse generator by said control circuit so that an output of said reception side first pulse generator differs from the phase of the pulse output from said reception side second pulse generator by exactly said predetermined value so as to establish synchronization between the received signal and the output signal of said reception side first pulse generator; wherein a time for the synchronization acquisition is shortened even without the presence of transmission information in a communication signal. --, therefor.